March 10, 1936.          G. L. BENNETT                    2,033,119
                      COMPARTMENT FREIGHT CAR
                       Filed April 25, 1933
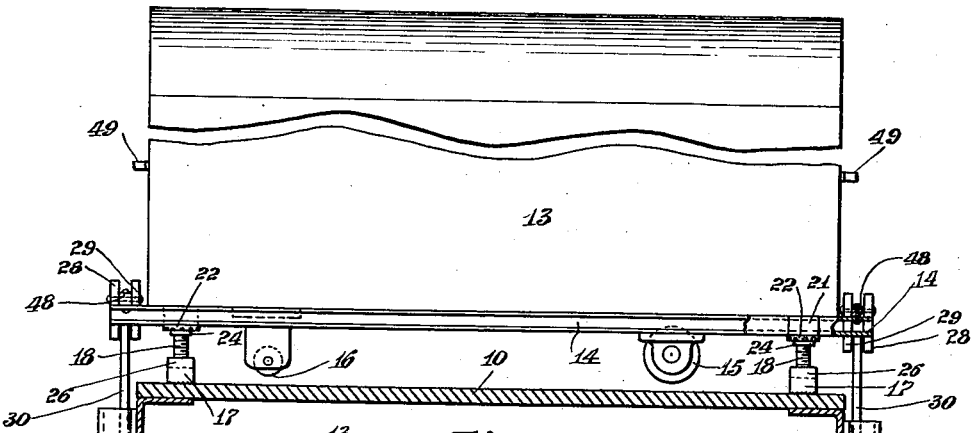
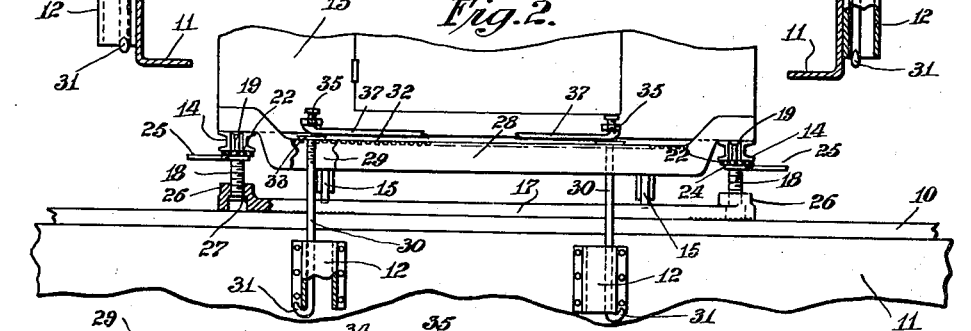
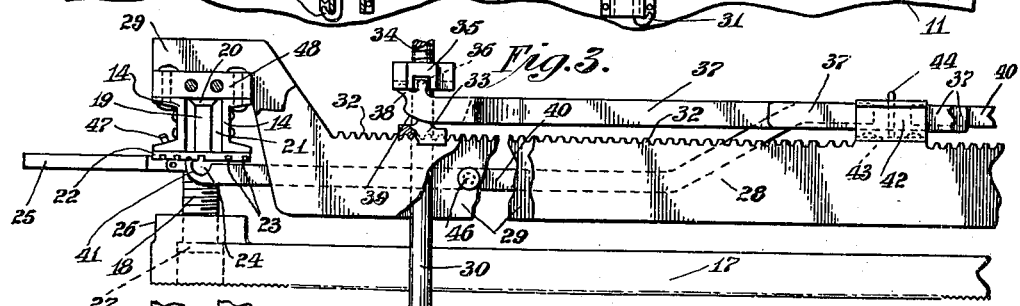
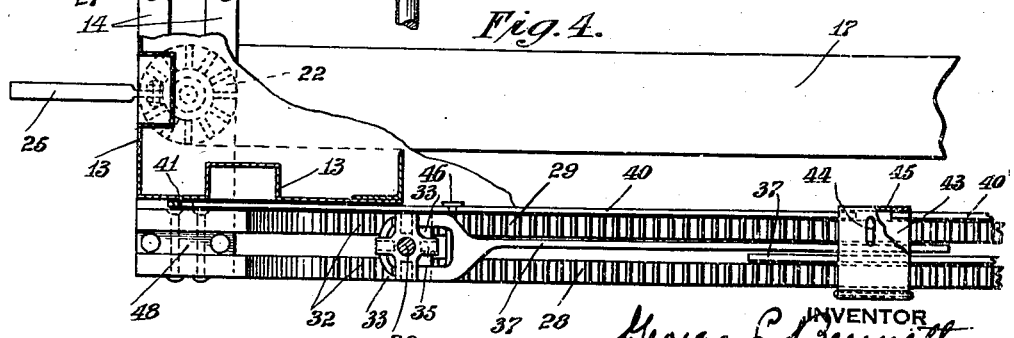

Patented Mar. 10, 1936

2,033,119

UNITED STATES PATENT OFFICE 2,033,119

COMPARTMENT FREIGHT CAR

George L. Bennett, Terre Haute, Ind.

Application April 25, 1933, Serial No. 667,778

14 Claims. (Cl. 105—366)

My invention relates to compartment freight cars, and more particularly to the structure of the movable containers and of the mechanisms employed for securing such containers upon flat cars so as to avoid possibility of displacement during transportation, while facilitating the loading or unloading of the containers upon or from the car.

To facilitate the handling of local freight and the shipment of less than carload lots of freight, the railroads have resorted to the use of containers, a number of which may be removably loaded and transported, upon a flat car. These containers are loaded at receiving freight houses or terminal warehouses and are removed in their entirety to the unloading platforms or upon trucks for local transportation at the point of destination or are transferred in their entirety from car to car at transfer points, thus avoiding the necessity for unnecessary re-handling of the freight contained therein. It is possible with the type of car to which the invention relates, to use these containers in what may be called door to door freight service in which case, the containers may be loaded or unloaded at the warehouse of the shipper or the consignee and transported to or from the railroad freight house in motor trucks.

To expedite movement of the containers between trucks and the flat cars and about a freight house or terminal warehouse, one type of such container is provided with wheels which in addition to facilitating their movement as described, permits the use of such containers in shipping freight to and from points where derrick or crane facilities are not available. My invention is particularly adaptable for use in connection with wheeled containers, since such containers are particularly susceptible to lateral displacement upon the flooring of a flat car while a train is in motion.

During transit upon flat cars, containers thereon are subjected to liability of displacement, not only from the jars resulting from the stopping and starting of trains, and the vibrations because of track and running gear conditions, but to a toppling and sliding thereof when the car is upon a banked curve either because of the inclination of the car flooring or of centrifugal force in making such curves at high speeds.

Wheel containers are more subject to such displacement than those containers which rest firmly upon the car floor.

With the above conditions in mind, I have provided a less than carload freight container of the wheeled type, wherein means are provided for preventing displacement of the container in relation to the floor of a flat car by relieving the wheels from the load of the container and its contents and transferring this load to members which, by contact with the floor of the car, will resist movement of the container along said floor. The mechanisms and elements employed are of a character which will permit them to be brought and maintained out of engaging relation with the floor of the car, of a truck, of a landing platform, or of a warehouse to facilitate its movement on its wheels when loading or unloading the container on or from a car and about a platform or warehouse. Furthermore, such mechanisms and elements, and all parts thereof necessary to their convenient actuation, are permanently connected with the container so as to preclude any possibility of their being lost or misplaced, thus having available about the container at all times, the necessary agencies to facilitate the attachment or release of a container to or from the car.

The effect of said elements and said mechanisms is dependent upon the dead weight of the container and its contents so that in conjunction therewith, I provide agencies which not only increase the effectiveness of said other elements and mechanisms in resisting movement of the container upon the car floor, but will also act to prevent tilting of the container while the car is in transit. Said last named means are so constructed as to utilize standard equipment with which all flat cars are provided and to be adaptable to different designs or models of flat cars, in which the construction and location of such equipment varies in design and location.

The construction of the means supplementing the members supporting the load of the container from the car floor and preventing tilting of the container is such that all of the operative parts thereof form a permanent part of the container, thus avoiding those delays resulting from the loss or misplacement of parts.

Each of the means above referred to, those for sustaining the load of the container from the floor of the car and those preventing tilting of the container and increasing the effectiveness of the former means, are provided with independently actuated manual operating means, which means may also be utilized for preventing unauthorized actuation of these mechanisms to permit removal of the containers from a car along the right of way for the purpose of stealing the contents of the containers.

The invention consists primarily in a compartment freight car, embodying therein a less than car load container, supporting wheels therefor, an elongated support at each end of said container, a plurality of manually operative members adjustably connected with said container and with each support, whereby movement may be imparted to said supports from or toward the body of the container into engagement with a car or other flooring to prevent, or out of engagement therewith to permit, movement of the container on its wheels, and vertically movable means at each end of the container and engageable with a stake pocket upon a car, whereby side tilting of a container upon said supports is prevented; and in such other novel features of construction and combination of parts as are hereinafter set forth and described, and more particularly pointed out in the claims hereto appended.

Referring to the drawing,

Fig. 1 is a vertically condensed side view of a compartment freight car container embodying the invention, upon a flat car;

Fig. 2 is an end view of the lower portion thereof;

Fig. 3 is a detail view upon a larger scale of the hold-down mechanisms at one end and adjacent one side of a container; and Fig. 4 is a plan view of the mechanisms shown in Fig. 3.

Like numerals refer to like parts throughout the several views.

Less than car load freight containers embodying the invention are so constructed as to be transported by rail upon flat cars forming a part of the standard equipment of railroads, and the various mechanisms and devices are so constructed and arranged as to permit the use of such containers upon various standard types of flat cars, these mechanisms being adjustable in relation to the container to permit their adaptation to different arrangements of parts common to all flat cars.

In the drawing, a part of the flooring of an ordinary flat car is shown at 10, the underframe thereof at 11, and the usual stake pockets at 12. The body of the container, which may be of any desired or approved design and construction, is shown at 13, this body having an underframe consisting of parallel channel bars 14 adjacent opposite sides, and extending beyond the ends of the container.

The container is provided with supporting wheels 15 and 16, the detailed construction and arrangement of which are immaterial to the present invention which relates particularly to what is known as the "hold-down mechanisms", or mechanisms which under one condition permit free movement of the container upon said wheels 15 and 16, and under other conditions prevent such movement and also prevent side swaying of the container.

The hold-down mechanisms consist of two independently operative mechanisms, one of which is adapted, by engagement with the floor of a car, to prevent movement of the container in relation thereto, and the other of which is adapted to positively connect the container with the car platform and its underframe, by means of the stake pockets, in a manner to prevent any possible tilting of the container. The last named mechanism is also used to increase the effectiveness of the former mechanism in securely anchoring the container to the car flooring.

The former mechanism comprises supports 17 adjacent opposite ends of the container and supported therefrom by means, such as the screws 18, co-operating with screw threaded openings in said support, whereby said supports may be engaged with a car or other flooring to prevent, or disengaged therefrom to permit, movement of the container upon the wheels 15 and 16. Each screw 18 is provided with a reduced stem 19 having an enlarged head 20 engageable with suitable bearings 21 carried between the beams of the underframe 14. Each screw is also provided with an enlarged head 22 bearing upon the underframe of the container and having radially extending slots 23 on the underface thereof. Mounted upon the stem 19 below the enlarged head 22 is a swivelling member 24 having pivoted thereto a wrench 25, the axis of the pivot being such as to permit said wrench member to be raised or lowered in relation to said head 22 so as to secure a ratchet effect in the turning of the screw 18. The swivelling sleeve is used to avoid possibility of misplacement or loss of the wrench member 25.

The support 17 preferably comprises an elongated bar having a roughened lower face to ensure a firm grip upon the flooring with which it is engaged by the action of the screws 18. This arrangement affords a wide gripping area and avoids any possibility of the turning of the support upon the actuation of a screw, since each support is engaged by two such screws. The screw threads upon the support co-operating with the screws 18 are formed in bosses 26, the support below these bosses being recessed to afford the necessary clearance to permit the raising of the support to a plane sufficiently above the flooring to avoid interference with a free movement of the container upon its wheels when either loading it upon or unloading it from, a flat car, or a truck and when moving it about the floor of a warehouse or other building.

If desired, the lower end of each screw 18 may be provided with an enlarged head 27 to avoid possible separation of the support from said screws.

It is obvious that with the lowering of the supports 17 so as to engage the lower face thereof with the car or other flooring, movement of the container upon its wheels 15 and 16 will be prevented and that after such engagement of the supports with said flooring, the screws 18 be actuated to further raise the container so that the effectiveness of said supports in preventing movement of the container will be increased by transferring the entire load of the container from the wheels to the supports. The utilization of the load of the container in developing the desired gripping action between the supports and the flooring is particularly desirable when a container is upon a flat car or other vehicle since it goes beyond a mere braking action which may suffice when the container is in a warehouse or other building.

When the container is mounted upon a flat car or upon a truck or dray, it is subjected to various shocks and jars during transportation, and when passing about curves, particularly at high speeds or when the curves are well banked, it is liable to topple notwithstanding the use of the supports 17 and the grip which said supports have upon the car or other flooring. It is desirable, therefore, to provide means which will prevent any tendency of the container to topple, and I provide means for this purpose which are so constructed as to not only firmly hold the container in relation to the car or other flooring, but will supplement the load of the container upon said supports 17 in developing the desired gripping action of said supports. This anti-toppling mechanism is so constructed that it will co-operate with mechanisms forming a part of the standard equipment of a flat car, one purpose of the invention being to provide a container which may be firmly secured to such a car, so as to be readily transported thereon without requiring any special construction of car or the use of any special attachments thereon. By avoiding any special structural characteristics in the car itself, special rolling stock for the transportation of the less than carload containers is unnecessary and the same cars used in transporting such containers may be used in the usual way for the handling of other freight.

Extending along each end of the container from side to side thereof, is what may be termed a "slot bar", consisting of two parallel bars 28 and 29 spaced in relation to each other to provide clearance for the reception of rods 30 having a hook 31 at one end thereof adapted to pass through, and engage the lower edge of, a stake pocket. Said bars 28 and 29 are each provided along the top edge, thereof with toothed sections 32 by means of which cam blocks 33 through which the rod 30 passes are adjustably supported from said bars. This construction permits the locating of said rods in relation to the stake pockets with which they are adapted to co-operate by adjustment of the cam blocks 33 with said rods longitudinally of the bars 28 and 29 and of the flat car indicated at 10.

The upper end of the rod 30 is screw threaded, as shown at 34, and mounted thereon is a cruciform nut 35. Each arm of the under face of the nut is recessed to form a bearing for the reception of a projection 36 upon a locking lever 37 having a looped end 38 extending about the rod 30. Each arm of the looped portion is provided with a cam surface 39 co-operating with the cam surfaces upon the block 33.

By this arrangement, upward movement may be imparted to the rod 30, sufficient to take up any possible lost motion between the hooked end 31 of said rod 30 and the stake pocket 12 with which it co-operates, and the container in its entirety may be forced downwardly so as to supplement the load of the container in developing the desired gripping action of the supports 17 upon the car or other flooring. The effectiveness of this action will be determined by the adjustment of the nut 35 and the pitch of the co-operating cam surfaces upon the lock lever 37 and upon the cam block 33.

The adjustability of the nut 35 is for the purpose of securing an approximately close engagement of the hooked ends 31 of the rod 30 with the stake pocket, and the adjustment of the length of the rod below the slot bar to compensate for variation in the depth of said pockets upon different flat cars.

The slot bar may be attached to the container in any desired manner, although preferably I suspend it from, and secure it to, the projecting ends of the bars 14 forming the under frame of the container.

The looped end of the lock lever 37 and the form of the nut 35 afford clearance necessary for the oscillation of the lever, and permit the lever to be drawn out of its operative relation to the nut 35 for the purpose of permitting adjustment of the nut, while precluding any possibility of the removal of the lever from the mechanism. This arrangement also permits the lever to be brought to a position above and closely adjacent the slot bar for the purpose of so locking the lever as to prevent tampering with the mechanism. The rods 30 and the mechanisms operative thereon are duplicated adjacent opposite sides of each end of the container.

The mechanisms heretofore described may be used to prevent accidental movement of a container while upon a flat car, or a truck or dray. During transportation of the containers it is highly desirable to prevent tampering with the means for securing the container in position to prevent thefts of the merchandise contained therein, particularly along the right of way of a railroad. When a wheeled container is used, such containers might readily be forced from a flat car if the attachment means could be made inoperative.

As heretofore pointed out, it is desirable to so construct the actuating means for the mechanisms by which the containers are attached to the car as to prevent the removal or loss of these actuating means. While this practice has the advantage of avoiding difficulties and delays in loading or unloading the containers, it has the disadvantage that such actuating means are always at hand and available to permit the unauthorized release of the container.

To guard against such unauthorized release of the container, I provide means whereby the actuating means operative upon the mechanisms employed for raising and lowering the supports 17 and the lock levers 37 may be employed to prevent the unauthorized use of said actuating means and said levers respectively for releasing the container.

The means operative upon the wrench 25 consists of a lever 40 having a recess 41 adjacent the end of one arm thereof, which recess is adapted to partially inclose and engage the wrench 25.

Carried by the bar 28 is a plate 42 having a cover 43 hinged thereto. The other bar 29 carries a hasp 44 projecting through an opening in the cover 43. This cover 43 is provided with a flange 45 at one edge thereof of a depth to prevent the escape of the lever 40 therefrom. The lever 40 is pivoted to the bar 29 at 46. One arm of the lever 37 is located substantially centrally of the slot bars 28 and 29 and is of a length to be positioned beneath the cover 43, irrespective of the position of the rod 30 and cam block 33.

The confining mechanism, consisting of the cover 43 and hasp 44, serves merely to prevent oscillatory movement of the levers 37 and 40, none of the parts thereof being connected with said levers. This construction of confining mechanism permits the adjustment of the cam blocks 33 and rod 30 longitudinally of the slot bar. One confining mechanism is used for the levers 37 and 40 at each side of the car. The lever 40 at each side of the car is of a length to be engaged by the cover 43 in a manner to allow sufficient space for the engagement of the lever 40 at the other side of the car by said cover.

To permit the independent adjustment of the levers 37 and the parts associated therewith at opposite sides of the car, it is necessary to have the free ends of these levers positioned in parallel vertical planes so that they may lap each other, as shown in Fig. 4, in a manner to permit movement of these levers longitudinally of the slot bar.

The underframe of the car is provided with a suitable lubricating device 47 for the head 22 of the screw 18. A spacer 48 between the bars 28 and 29 is secured to the angle bars 14 forming the underframe of the container and to said bars 28 and 29.

At each end of the container, I provide keepers 49 above each rod 30, each keeper being adapted to engage a nut 35 so as to hold the rod in a position where it will not interfere with movement of the container upon its wheels.

The operation of the herein described mechanism is substantially as follows:—

The main purpose of the mechanisms herein described is to secure a less than carload container upon a flat car in a manner which will practically make it an integral part of the car while in transit, and to permit the positioning of the various mechanisms employed so as to avoid interference with the free movement of the container upon its wheels when so desired, as when loading or unloading a container upon or from a car, truck or dray and when moving it about a loading platform or warehouse. The mechanisms used in moving the container form no part of the present invention and are not shown in the drawing nor described.

Containers of the type to which the invention relates are of a length approximating the width of the flooring of an ordinary flat car, the slot bars 28—29 projecting beyond the sides of the flat car to an extent to position them substantially directly above the stake pockets carried upon the side edges of the car floor.

Such containers possess considerable weight, which may vary widely in some instances approximating two tons. The dimensions of the container are such as to permit a freight load which may amount to five tons. With such a container, the maximum load upon the wheels would be in the neighborhood of seven tons.

A wheeled container for less than carload lots of freight has the advantage that it may readily be moved about at points where cranes and derricks are not available. It has the disadvantage, however, that it lacks that immobility necessary to ensure safety during transportation upon flat cars or local delivery vehicles. The subject matter of the present invention is designed to overcome such disadvantage.

The mechanisms used for moving the container form no part of the present invention so that a description of the procedure to be followed in handling the containers will be limited to the operation of the means preventing or permitting such movement of the container.

Under normal conditions, the supports 17 will be so elevated by the screw 18 as to be positioned sufficiently above the wheels 15 and 16 to clear any obstructions, such as the edges of gang planks along which the container is to be moved. The rods 30 are normally retained by the keepers 49 where they will not interfere with the free movement of the container.

When it is desired to prevent movement of the container upon its wheels, the supports 17 are lowered by turning the screws 18 by means of the wrenches 25 associated with each of said screws. A desired ratchet effect is attained by raising the wrench into engagement with one of the slots upon the under face of the screw head 22, and after the desired turning movement has been imparted to the screw, by lowering it so as to disengage it from said head preparatory to the next turning operation of the screw. The screws operative upon the opposite ends of each support may be turned successively or simultaneously until the lower face of the support engages the flooring upon which the container rests.

After contact of the supports 17 with the flooring, additional turning of the screws 18 raises the container sufficiently to transfer the entire load thereof to the supports, and thus prevent movement of the container upon its wheels. By using long supports 17, increased gripping area of the bottom of these supports upon the flooring is secured, and by using two screws upon each support, turning movement of the supports with the screws is prevented.

When the supports at opposite ends of the container have been set as described, the wrench operative upon the head 22 of each screw 18 is raised into engagement with said head and the locking lever 40 is engaged with the wrench, the recessed end of this lever preventing such movement of the wrench as will actuate the screw. The opposite arm of the lever 40 when in this position, will be in the operative relation to the retaining mechanism, where it may be engaged by the cover 43. With this arrangement, the wrench operative upon each screw 18 forms a permanent part of the equipment of the container and is also utilized to prevent the unauthorized actuation of the supports 17 to permit return of the load of the container to the wheels for the purpose of facilitating movement of the container.

While the supports 17 are effective in preventing movement of the container in the manner described, they do not prevent tilting of the container during transportation thereof upon flat cars. The hold-down rods 30 are embodied in the structure mainly for the purpose of preventing tilting thereof upon a flat car when passing around curves. When a container is positioned upon a flat car, and after the supports have been set in the manner described, the rods 30 are lowered and the hook ends 31 thereof, are passed through stake pockets at the side edges of the car. If adjustment is necessary to bring the rods to a position where they may pass through the stake pockets, the cam blocks 33 are shifted along the slot bars 28 and 29 and the nut 35 is actuated to ensure the desired length of rod between the said nuts and the hook nut 31 thereof. During this adjustment of the rod, the projection 36 of the lock lever 37 is disengaged from the nut. After adjustment of the nut, however, said projections are engaged with the openings in opposite arms thereof and the lock lever is depressed, the cam surfaces 39 thereof by engagement with the cams upon the block 33 raising the rod so as to engage the hooked end 31 with the under edge of the stake pocket. After such engagement of the hooks with the stake pockets, continued movement of the lock lever develops continued stresses upon the underframe of the container through the slot bars so as to not only avoid any possible looseness in the connection between the container and the car flooring secured by the rod 30, but to materially increase the gripping action of the supports 17 upon the floor of the car.

The stresses developed by this movement of the lock levers is governed by the co-operation and the pitch, of the cam surfaces thereon and upon the cam block 33, the construction of these parts as shown in the drawing, being calculated to increase the pressure of the supports upon the flooring by approximately twelve tons.

When the lock levers at each end of the car have been actuated to their full extent, the free ends thereof are positioned within the operative range of the cover 43 of the confining mechanism, this cover acting upon both levers at the same end of the container.

When the lever is in this position, the projection 36 thereon is engaged with the nut 35 so as to prevent turning of this nut in a manner to prevent disengagement of the hook 31 from the stake pocket.

The loop at the end of the container adjacent the cam surfaces 38 thereof serves merely to prevent the removal of the lock lever from the container.

After the parts have been set in the manner described, the cover 43 is lowered in relation to the ends of the various levers and to the hasp 44 and a pad lock used to prevent the unauthorized raising of said cover.

When the various mechanisms have been actuated in the manner described, containers upon a flat car will be so securely fastened thereto as to prevent any movement of the container upon a car platform as a result of the jolts and jars incidental to the movement of the flat car along the right of way or the application of brakes and any side tilting of the container is effectively prevented. In fact, the containers become temporarily as permanent as an ordinary car body.

When it is desired to transfer a container from one car to another or from a car to a delivery vehicle, or from a car to a loading platform, the operations above described are reversed so that the load of the vehicle is again borne by the wheels 15 and 16 to permit the rolling of the container from place to place as desired.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is:—

1. A compartment freight car, embodying therein a less than carload container, supporting wheels therefor, an elongated support at each end of said container, a plurality of manually operative members adjustably connected with said container and with each support, whereby movement may be imparted to said supports from or toward the body of the container into engagement with a car or other flooring to prevent, or out of engagement therewith to permit, movement of the container on its wheels, and vertically movable means at each end of the container and engageable with a stake pocket upon a car, whereby side tilting of a container upon said supports, is prevented.

2. A compartment freight car embodying therein a less than carload container, means extending along each end of the container from side to side, a rod at each end of said container having a hook at one end thereof adapted to engage the under edge of a stake pocket upon a flat car, a member carried by the container in which said rod is vertically movable, co-operating means carried by said means and said member, whereby said rod may be adjusted lengthwise of said means and held against displacement, manually operative means co-operating with said rod and said member, whereby the hook upon said rod may be drawn into engagement with the stake pocket and downward stresses may be applied through said member to the container and an adjustable member carried by said rod and engageable by said last named means, whereby the length of said rod below said member may be varied to ensure the desired operative relation between said hook and the stake pocket.

3. A compartment freight car, embodying therein a less than carload container, supporting wheels therefor, a plurality of supports carried by said container, means carried by the container and acting upon said supports respectively, whereby movement may be imparted to said supports from or toward the body of the container into engagement with a car or other flooring to prevent, or out of engagement therewith to permit, movement of the container on its wheels, a rod at each end of said container having a hook at one end thereof adapted to engage the under edge of a stake pocket upon a flat car, a member carried by the container in which said rod is vertically movable, and means co-operating with said rod and said member whereby the hook upon said rod may be drawn into engagement with the stake pocket and downward stresses may be applied to the container.

4. A compartment freight car embodying therein a less than carload container, supporting wheels therefor, an elongated support at each end of said container, a plurality of manually operative members adjustably connected with said container and with each support, whereby movement may be imparted to said supports from or toward the body of the container into engagement with a car or other flooring to prevent, or out of engagement therewith to permit, movement of the container on its wheels, vertically movable means at each end of the container and engageable with a stake pocket upon a car, whereby side tilting of a container upon said supports, is prevented, and a locking member engageable with said manually operative members to prevent unauthorized actuation of said supports.

5. A compartment freight car embodying therein a less than carload container, means extending along each end of the container from side to side, a rod at each end of said container having a hook at one end thereof adapted to engage the under edge of a stake pocket upon a flat car, a member carried by the container in which said rod is vertically movable, co-operating means carried by said means and said member, whereby said rod may be adjusted lengthwise of said means and held against displacement, manually operative means co-operating with said rod and said member, whereby the hook upon said rod may be drawn into engagement with the stake pocket and downward stresses may be applied through said member to the container, an adjustable member carried by said rod and engageable by said last named means, whereby the length of said rod below said member may be varied to ensure the desired operative relation between said hook and the stake pocket, and a locking member engageable with the means co-operating with the rod and said member, whereby the unauthorized actuation of said rod to disengage the hook from the stake pocket, is prevented.

6. A compartment freight car embodying therein a less than carload container, supporting wheels therefor, a plurality of supports carried by said container, means carried by the container and acting upon said supports respectively, whereby movement may be imparted to said supports from or toward the body of the container into engagement with a car or other flooring to prevent, or out of engagement therewith to permit, movement of the container on its wheels, a rod at each end of said container having a hook at one end thereof adapted to engage the under edge of a stake pocket upon a flat car, a member carried by the container in which said rod is vertically movable, means co-operating with said rod and said member whereby the hook upon said rod may be drawn into engagement with the stake pocket and downward stresses may be applied to the container, and means whereby the unauthorized actuation of said supports and said rods may be prevented.

7. A compartment freight car embodying therein a less than carload container, supporting wheels therefor, a plurality of screws at each end, and adjacent each side, of said container, means whereby said screws are revolubly connected with the container, an elongated support adjacent each end of the container having screw threads engaged by the screws at the same end of the container, means whereby said screws may be actuated to impart movement to said supports from or toward the body of the container into engagement with a car or other flooring to prevent, or out of engagement therewith said flooring to permit, movement of the container on its wheels and vertically movable means at each end of the container and engageable with the stake pocket upon a car, whereby side tilting of the container upon said supports is prevented.

8. A compartment freight car embodying therein a less than carload container, supporting wheels therefor, a plurality of screws at each end, and adjacent each side, of said container, each of said screws having an enlarged head having radial slots on the under face thereof, means whereby said screws are revolubly connected with the container, an elongated support adjacent each end of the container having screw threads engaged by the screws at the same end of the container, a collar movable upon each screw and a wrench pivoted upon said collar whereby it may be engaged with and disengaged from the slots in the head of a screw, so that each screw may be actuated to engage the support with which it co-operates with a car or other flooring to prevent, or to disengage said support from said flooring to permit, movement of the container on its wheels.

9. A compartment freight car embodying therein a less than carload container, a slot bar at each end of the container, a cam block supported from and adjustable longitudinally of said slot bar, a rod passing through said cam block and said slot bar having a hook at one end thereof adapted to engage the under edge of a stake pocket upon a flat car, a locking lever co-operating with the cam block, and means carried by said rod and acted upon by said locking lever whereby the hook upon said rod may be drawn into engagement with the stake pocket and downward stresses may be applied to the container.

10. A compartment freight car embodying therein a less than carload container, a slot bar at each end of the container, a cam block supported from and adjustable longitudinally of said slot bar, a rod passing through said cam block and said slot bar having a hook at one end thereof adapted to engage the under edge of the stake pocket upon a flat car and screw threads toward the opposite end thereof, a locking lever having a forked end provided with cam surfaces co-operating with the cam block, and a cruciform nut co-operating with the screw threads upon said rod and acted upon by said locking lever, whereby the hook upon said rod may be drawn into engagement with the stake pocket and downward stresses may be applied to the container.

11. A compartment freight car embodying therein a less than carload container, a slot bar having a plurality of teeth upon the upper surface thereof at each end of the container, a cam block having teeth thereon co-operating with the teeth upon said slot bar whereby said block may be adjusted longitudinally of said bar, a rod passing through said cam block and said slot bar having a hook at one end thereof adapted to engage the under edge of a stake pocket upon a flat car, a locking lever cooperating with the cam block, and means carried by said rod and acted upon by said locking lever whereby the hook upon said rod may be drawn into engagement with the stake pocket and downward stresses may be applied to the container.

12. A compartment freight car embodying therein a less than carload container, a slot bar having a plurality of teeth upon the upper surface thereof at each end of the container, a cam block having teeth thereon co-operating with the teeth upon said slot bar whereby said block may be adjusted longitudinally of said bar, a rod passing through said cam block and said slot bar having a hook at one end thereof adapted to engage the under edge of a stake pocket upon a flat car, a locking lever cooperating with the cam block, means carried by said rod and acted upon by said locking lever whereby the hook upon said rod may be drawn into engagement with the stake pocket and downward stresses may be applied to the container, and a container having a staple and a hinged cover carried by said slot bar and adapted to receive said locking lever, whereby the unauthorized actuation of said lever may be prevented.

13. A compartment freight car embodying therein a less than carload container, supporting wheels therefor, a plurality of screws at each end, and adjacent each side, of said container, each of said screws having an enlarged head having radial slots on the under face thereof, means whereby said screws are revolubly connected with the container, a support adjacent each end of the container having screw threads engaged by the screws at the same end of the container, a collar movable upon each screw, a wrench pivoted upon said collar whereby it may be engaged with and disengaged from the slots in the head of a screw, so that each screw may be actuated to engage the support with which it co-operates with a car or other flooring to prevent, or to disengage said support from said flooring to permit, movement of the container on its wheels, a slot bar at each end of the container, a cam block supported from said slot bar, a rod passing through said cam block and said slot bar having a hook at one end thereof adapted to engage the under edge of a stake pocket upon a flat car, a locking lever co-operating with the cam block, means carried by said rod and acted upon by said locking lever whereby the hook upon said rod may be drawn into engagement with the stake pocket and downward stresses may be applied to the container, a locking lever pivoted upon said slot bar and having a recess engageable with said wrench, and a container having a staple and a hinged cover carried by said slot bar and adapted to receive said locking levers respectively, whereby the unauthorized actuation of said levers may be prevented.

14. A compartment freight car embodying therein a less than carload container, supporting wheels therefor, a slot bar at each end of the container, a cam block supported from and adjustable longitudinally of said slot bar, a rod passing through said cam block and said slot bar having a hook at one end thereof adapted to engage the under edge of a stake pocket upon a flat car, a locking lever co-operating with the cam block, means carried by said rod and acted upon by said locking lever whereby the hook upon said rod may be drawn into engagement with the stake pocket and downward stresses may be applied to the container, and keepers upon said container above said slot bar, whereby said rods may be so positioned as to permit movement of the container upon its wheels.

GEORGE L. BENNETT.